United States Patent
Sharawi et al.

(10) Patent No.: US 9,482,735 B2
(45) Date of Patent: Nov. 1, 2016

(54) MICROWAVE RADIO DIRECTION FINDING SYSTEM

(71) Applicant: KING FAHD UNIVERSITY OF PETROLEUM AND MINERALS, Dhahran (SA)

(72) Inventors: Mohammad S. Sharawi, Dhahran (SA); Rifaqat Hussain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 722 days.

(21) Appl. No.: 14/023,467

(22) Filed: Sep. 11, 2013

(65) Prior Publication Data

US 2015/0070217 A1 Mar. 12, 2015

(51) Int. Cl.
| | | |
|---|---|---|
| G01S 3/48 | (2006.01) | |
| G01S 7/03 | (2006.01) | |
| G01S 7/28 | (2006.01) | |
| G01S 7/35 | (2006.01) | |
| G01S 13/44 | (2006.01) | |
| H01Q 21/06 | (2006.01) | |
| H01Q 25/02 | (2006.01) | |

(Continued)

(52) U.S. Cl.
CPC ............... *G01S 3/48* (2013.01); *G01S 3/043* (2013.01); *H01Q 21/065* (2013.01); *H01Q 25/02* (2013.01); *G01S 7/03* (2013.01); *G01S 7/28* (2013.01); *G01S 7/35* (2013.01); *G01S 13/449* (2013.01); *G01S 2007/358* (2013.01); *H01Q 9/045* (2013.01)

(58) Field of Classification Search
CPC ............ G01S 3/48; G01S 3/043; G01S 3/46; G01S 7/03; G01S 7/032; G01S 7/282; G01S 7/285; G01S 7/35; G01S 7/352; G01S 13/44; G01S 13/4409; G01S 2007/358; H01Q 9/045; H01Q 21/0006; H01Q 21/065; H01Q 25/02; H01Q 25/04
USPC .................... 342/147, 149–153, 175, 445
See application file for complete search history.

(56) References Cited

U.S. PATENT DOCUMENTS

| | | | | |
|---|---|---|---|---|
| 3,953,853 A | * | 4/1976 | Carter ..................... | H01Q 3/26 330/124 D |
| 4,104,583 A | * | 8/1978 | Engen ..................... | G01R 27/04 324/638 |

(Continued)

OTHER PUBLICATIONS

X. T. Fang, X.-C. Zhang, and C.-M. Tong, "A novel miniaturized microstrip six-port junction," Progress in Electromagnetics Research Letters, vol. 23, 129-135, 2011.

(Continued)

*Primary Examiner* — Peter Bythrow
(74) *Attorney, Agent, or Firm* — Richard C. Litman

(57) ABSTRACT

The microwave radio direction finding system includes two six-port (SP) circuits and 2×2 printed patch antennas, each of the SP circuits having a pair of the patch antennas connected to their inputs, one pair being separated horizontally in a Cartesian plane, the other pair being separated vertically. The output ports are connected to differential amplifiers that produce in-phase and quadrature signals, which are digitized and input to a digital signal processor, which computes the difference in phase for the signals received at each pair of antennas. The processor uses the differences in phase angles to compute both the azimuth and elevation of the received signals, and may do so simultaneously for signals in multiple bands in the microwave region.

7 Claims, 12 Drawing Sheets

(51) Int. Cl.
*G01S 3/04* (2006.01)
*H01Q 9/04* (2006.01)

(56) References Cited

U.S. PATENT DOCUMENTS

| | | | | |
|---|---|---|---|---|
| 4,521,728 | A * | 6/1985 | Li | G01R 27/06 |
| | | | | 324/638 |
| 4,649,391 | A * | 3/1987 | Tsuda | H01Q 25/02 |
| | | | | 342/153 |
| 4,978,963 | A | 12/1990 | Thorpe | |
| 5,461,387 | A * | 10/1995 | Weaver | G01S 19/36 |
| | | | | 342/357.27 |
| 5,717,405 | A * | 2/1998 | Quan | H01Q 25/02 |
| | | | | 333/117 |
| 6,266,010 | B1 * | 7/2001 | Ammar | H01Q 3/38 |
| | | | | 342/374 |
| 6,363,125 | B1 * | 3/2002 | Brankovic | H03D 1/2245 |
| | | | | 375/283 |
| 6,674,410 | B1 * | 1/2004 | Davidovitz | H01P 5/16 |
| | | | | 342/373 |
| 6,885,344 | B2 * | 4/2005 | Mohamadi | H01Q 1/38 |
| | | | | 343/700 MS |
| 6,963,307 | B2 * | 11/2005 | Mohamadi | H01Q 1/38 |
| | | | | 342/372 |
| 7,427,953 | B2 * | 9/2008 | Chiang | H01Q 3/40 |
| | | | | 342/373 |
| 7,577,464 | B2 | 8/2009 | Ezal et al. | |
| 8,305,265 | B2 | 11/2012 | Ezal et al. | |
| 8,334,808 | B2 | 12/2012 | Remez et al. | |
| 8,354,961 | B2 | 1/2013 | Kawasaki | |
| 2002/0140601 | A1 * | 10/2002 | Sanada | H04B 1/30 |
| | | | | 342/368 |
| 2002/0167445 | A1 | 11/2002 | Eden | |
| 2003/0090405 | A1 * | 5/2003 | Rauch | G01S 7/038 |
| | | | | 342/21 |
| 2006/0128503 | A1 | 6/2006 | Savarese et al. | |
| 2007/0247363 | A1 * | 10/2007 | Piesinger | H01Q 3/267 |
| | | | | 342/368 |
| 2007/0273575 | A1 * | 11/2007 | Yang | G01S 7/35 |
| | | | | 342/127 |
| 2008/0068256 | A1 * | 3/2008 | Niedzwiecki | G01S 7/032 |
| | | | | 342/146 |
| 2008/0204310 | A1 * | 8/2008 | Blessing | G01S 3/48 |
| | | | | 342/195 |
| 2008/0204318 | A1 | 8/2008 | Thomas et al. | |
| 2009/0273517 | A1 * | 11/2009 | Thiesen | H01Q 3/2605 |
| | | | | 342/372 |
| 2013/0293411 | A1 * | 11/2013 | Dehlink | G01S 3/043 |
| | | | | 342/194 |
| 2014/0232589 | A1 * | 8/2014 | Trotta | H03F 1/0205 |
| | | | | 342/175 |

OTHER PUBLICATIONS

Koelpin, A.; Vinci, G.; Laemmle, B.; Kissinger, D.; Weigel, R., "The Six-Port in Modern Society," Microwave Magazine, IEEE , vol. 11, No. 7, pp. 35,43, Dec. 2010.

* cited by examiner

MICROWAVE RADIO DIRECTION FINDING SYSTEM

BACKGROUND OF THE INVENTION

1. Field of the Invention

The present invention relates to microwave measurement systems and RF direction finding, and particularly to a microwave radio direction finding system that operates on multiple bands and that resolves direction in both the azimuth and elevation planes.

2. Description of the Related Art

Identifying the source location of an incoming radio frequency (RF) signal is called RF direction finding (DF). It is used to estimate the angle of arrival (AoA) of an incident RF signal(s). DF has been (and still is) of interest over the past few decades due to its potential applications, specifically in military applications, and also for non-military purposes. It has a wide range of applications, which include, but are not limited to, military aspects of identifying hostile transmissions, avionics, emergency services, and amateur radio use.

An RF direction finding (DF) system consists of an array of antennas followed by one or more receivers arranged in a way to determine the azimuth angle of a distant emitter. Fundamentally, in all direction finding (DF) systems, location of a target object is determined by angle-of-arrival (AoA) estimation. Classical techniques of RF direction finding are based on multiple antenna systems employing single or multiple receivers. Classical techniques, such as multiple-channel DF algorithms; Multiple Signal Classification (MUSIC), and Estimation of Signal Parameters via Rotational Invariance Technique (ESPRIT), use simultaneous phase information from each antenna to estimate the AoA of the signal of interest.

In many scenarios where mobile systems are needed, multiple receivers are impractical. Thus, single channel techniques are of interest, particularly in mobile scenarios. But most of the existing techniques for single channel direction finding are either older analog techniques or require extensive digital processing techniques. Thus, this limits the use of digital signal processing (DSP) techniques in handheld RF DF systems.

To overcome the extensive processing of RF direction finding DSP algorithms, microwave measurement-based six-port technology is used. These multiport measuring techniques are gaining wide acceptance due to their precision and due to lower processing requirements in microwave metrology. The six-port circuit was initially used as low cost alternative to a network analyzer. Additionally, a number of six-port circuits are designed to be used in beam direction finding systems. All of these systems are used to find the azimuth angle of a distant target object, but not the elevation angle (i.e., a single angle for the incoming wave).

Thus, a microwave radio direction finding system solving the aforementioned problems is desired.

SUMMARY OF THE INVENTION

The microwave radio direction finding (DF) system includes two six-port (SP) circuits and a planar array of 2×2 printed patch antennas. A horizontal pair of patch antennas is connected to a first SP circuit (SP-1), while a vertical pair of patch antennas is connected to a second SP circuit (SP-2). Any pair of vertical and horizontal antennas in the planar array can be used to collect the RF signals. Thus, this redundant antenna system can be used to give more accurate and robust measurement. The output of the SP structure is fed to difference amplifiers to produce in-phase (I) components and quadrature phase (Q) components. The I and Q components are connected to an analog-to-digital (A/D) converter to provide digital output signals. A processor operates on the digital output signals to determine azimuth (theta) and elevation (phi) angles of an incoming microwave signal. The system can be operated simultaneously on multiple bands in the microwave region.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The microwave radio direction finding system includes two six-port (SP) circuits and two pairs of patch antennas.

Figure 1:
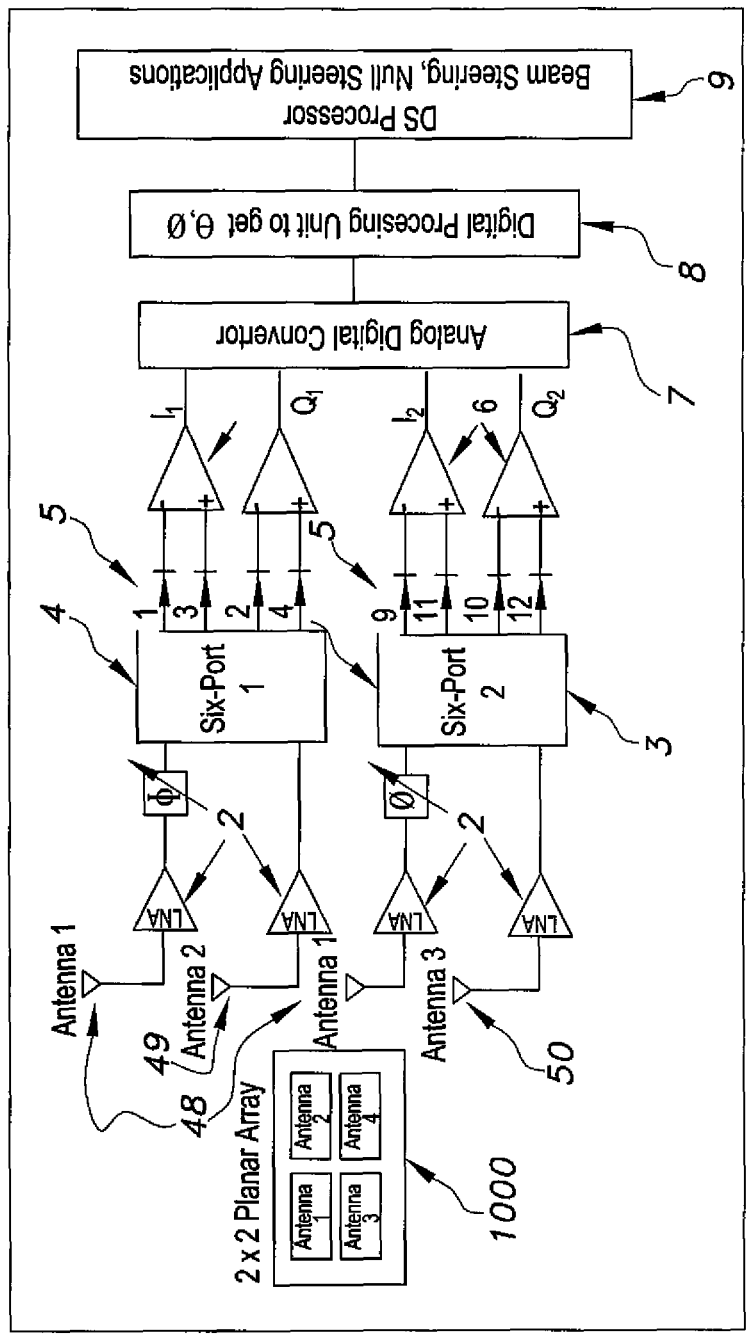
FIG. 1 is a block diagram of a microwave radio direction finding system according to the present invention.

FIG. 1 shows a block diagram of the microwave radio direction finding system. This system includes a first SP 3 and a second SP 4, a 2×2 planar antenna array 1000, four low-noise amplifiers 2, four power detector diodes 5 at output ports of SP 3, and four power detector diodes 5 at the output ports of SP 4, four difference amplifiers 6 to get the in phase (I) and quadrature (Q) components of an incoming signal, and a digital processing unit 8 to process these two components to get angles θ and Φ. The digital processing unit 8 may be a digital signal processor having software programmed to make the required calculations. The angle information of a distant target object extracted can be processed further using a second digital signal processor 9, which can perform, for example, beam steering and null steering applications. Two antennas 48 and 49, which feed a pair of the low noise amplifiers 2, are connected to the RF inputs of SP 4. The output signals of SP 4 are detected, amplified and processed to get ($I_1$) and ($Q_1$). Both of these components are processed to get the elevation angle θ. In a similar way, antennas 48 and 50 are used to obtain the azimuth angle Φ from components ($I_2$) and ($Q_2$). This is the distinguishing feature of the present system, to obtain both angles in the elevation and the azimuth planes using a compact, dual-angle structure design.

Figure 2:
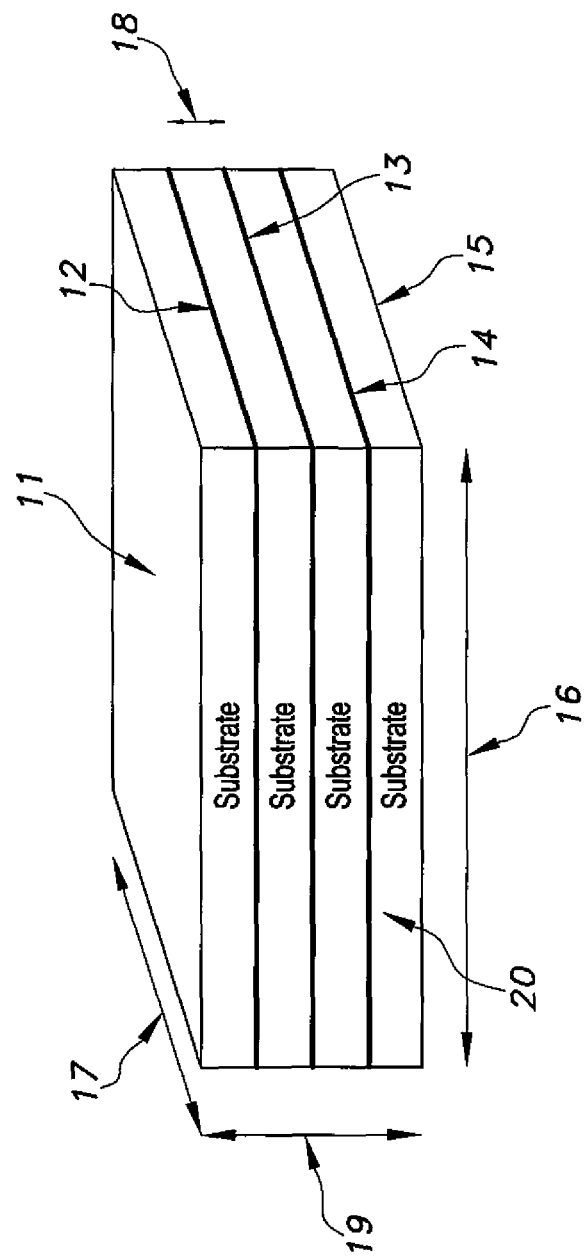
FIG. 2 is a perspective view of the printed circuit board stacks of a microwave radio direction finding system according to the present invention.

FIG. 2 shows the complete assembly of laminated PCB boards, containing the 2×2 planar antennas 1000, SP 3 and SP 4, and a ground plane 47. The antennas of the system are printed on the top PCB board 11 (in the orientation of FIG. 1) made of a dielectric material substrate 20 (the dielectric substrates in the laminated assembly may each be a printed circuit board (PCB)) having Relative Permittivity ($\in_r$) equal to 6.15. The thickness 18 of the substrate used is 0.64 mm. The total thickness 19 of the laminated assembly is 2.56 mm (0.64 mm×4). Reference plane or ground plane 12 is fabricated as INNER-1 layer (a copper surface between the top PCB board and the second PCB board). Reference plane or ground plane 14 is fabricated as INNER-3 layer (a copper surface between the third PCB board and the bottom PCB board). SP circuit 3 and SP circuit 4 are fabricated on INNER-2 layer 13 (a PCB surface between the second PCB board and the third PCB board) and bottom layer 15 (the bottom surface of the bottom PCB board), respectively. Total size of the laminated assembly, length 16, width 17 and height 19, is 65×65×2.56 mm³. The laminated assembly may be formed, e.g., by laminating PCB boards together with epoxy. The assembly thickness and material type can be changed, but structure tuning is required. This will alter the overall design dimensions, but can tune its operation to other bands.

Figure 3:
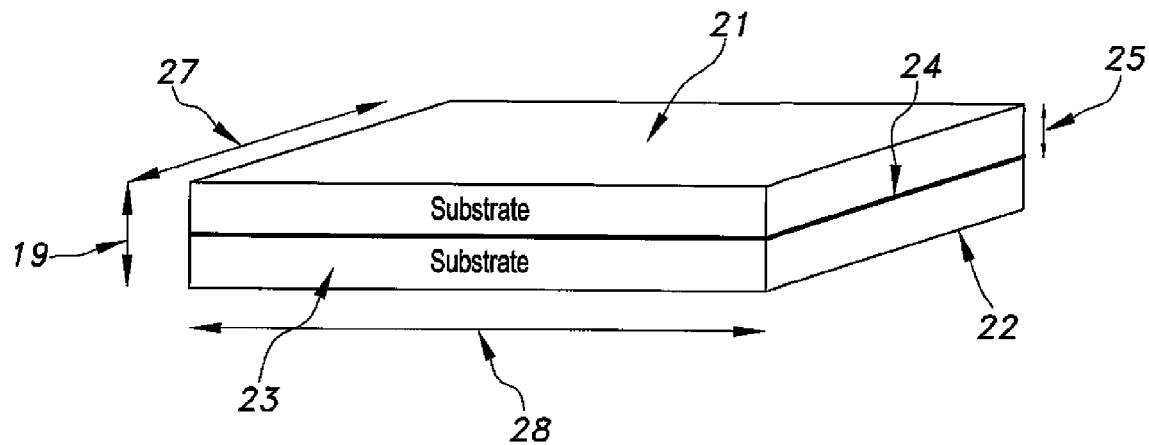
FIG. 3 is a perspective view of a subset of the printed circuit board stacks of FIG. 2.
Figure 4:
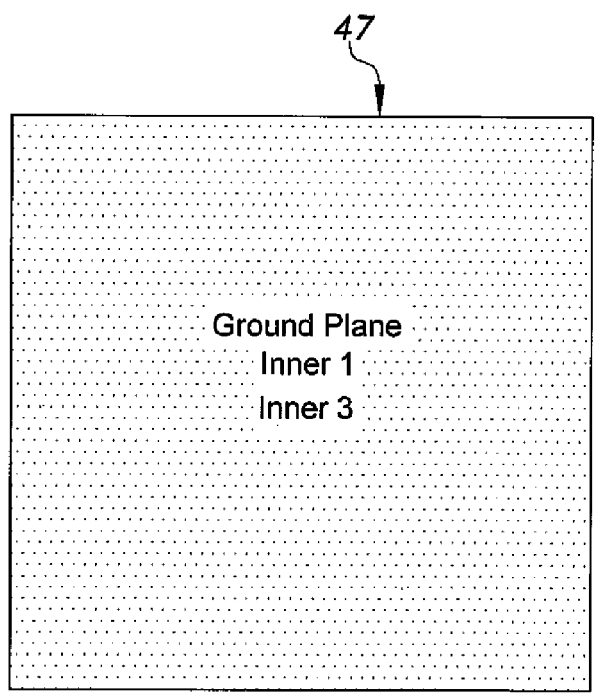
FIG. 4 is a top view of the ground planes of a microwave radio direction finding system according to the present invention.

Dual-angle three layer PCB assembly 20 with SP circuit 3 and 4, and ground plane 24 is shown in FIG. 3. The SP circuit 3 is a copper microstrip printed on the top surface 21 of the dielectric material substrate 23 with $\in_r$ equal to 6.15. The thickness 25 of the substrate used is 0.64 mm. Total thickness 26 of the three layer PCB assembly is 1.28 mm (0.64 mm×2). Reference plane or ground plane 24 is fabricated as INNER-1 layer (a copper-clad surface between the two PCB board substrates, shown in FIG. 4 to cover the entire surface of the substrate), while SP circuit 4 is fabricated as a copper microstrip printed on the bottom surface 22 of the bottom PCB board. Total dimensions of the three layer PCB assembly, including the length indicated by arrow 28, the width indicated by arrow 27, and the height indicated by arrow 19, are 65×65×1.28 mm³.

Figure 5:
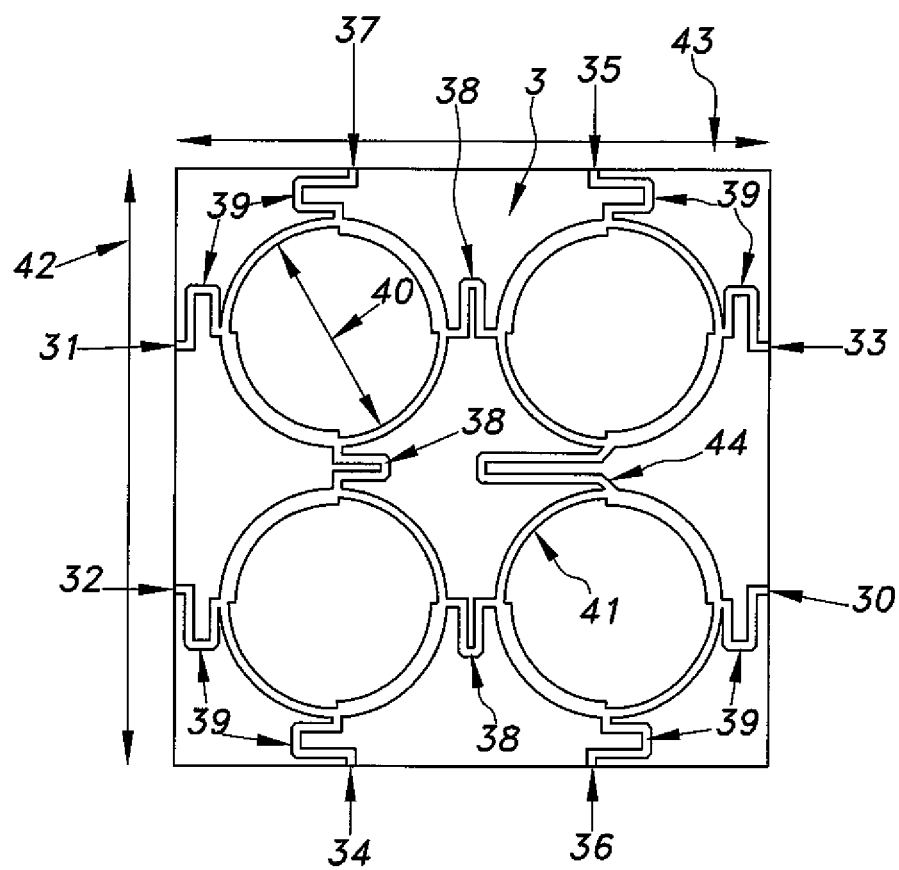
FIG. 5 is a top view of a first SP circuit of a microwave radio direction finding system according to the present invention.
Figure 6:
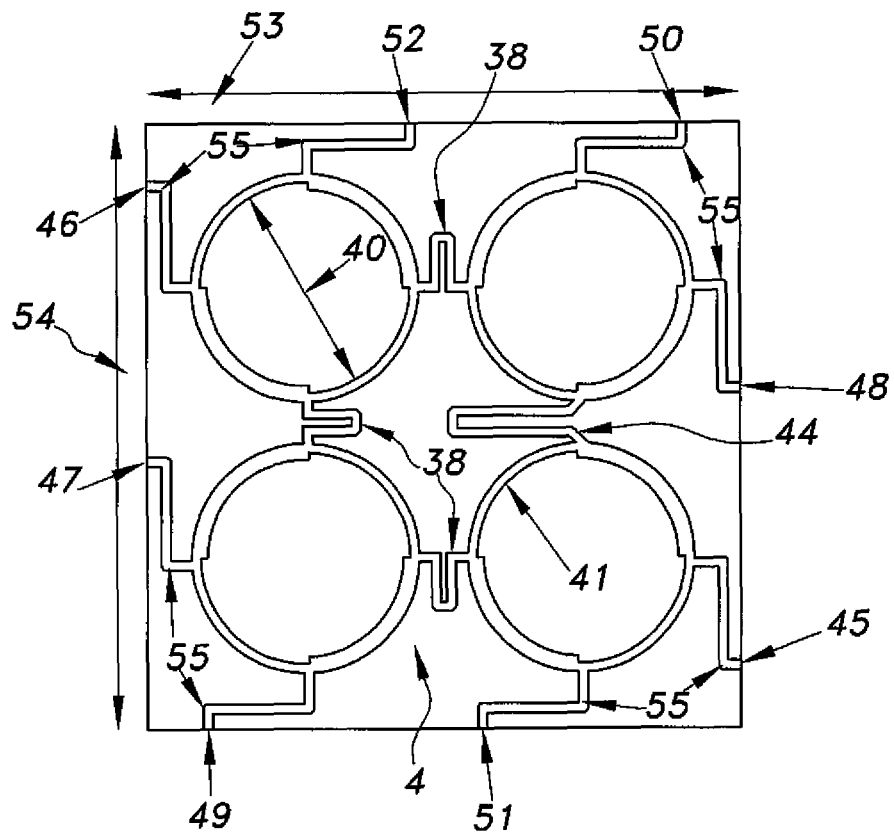
FIG. 6 is a top view of a second SP circuit of a microwave radio direction finding system according to the present invention.
Figure 7:
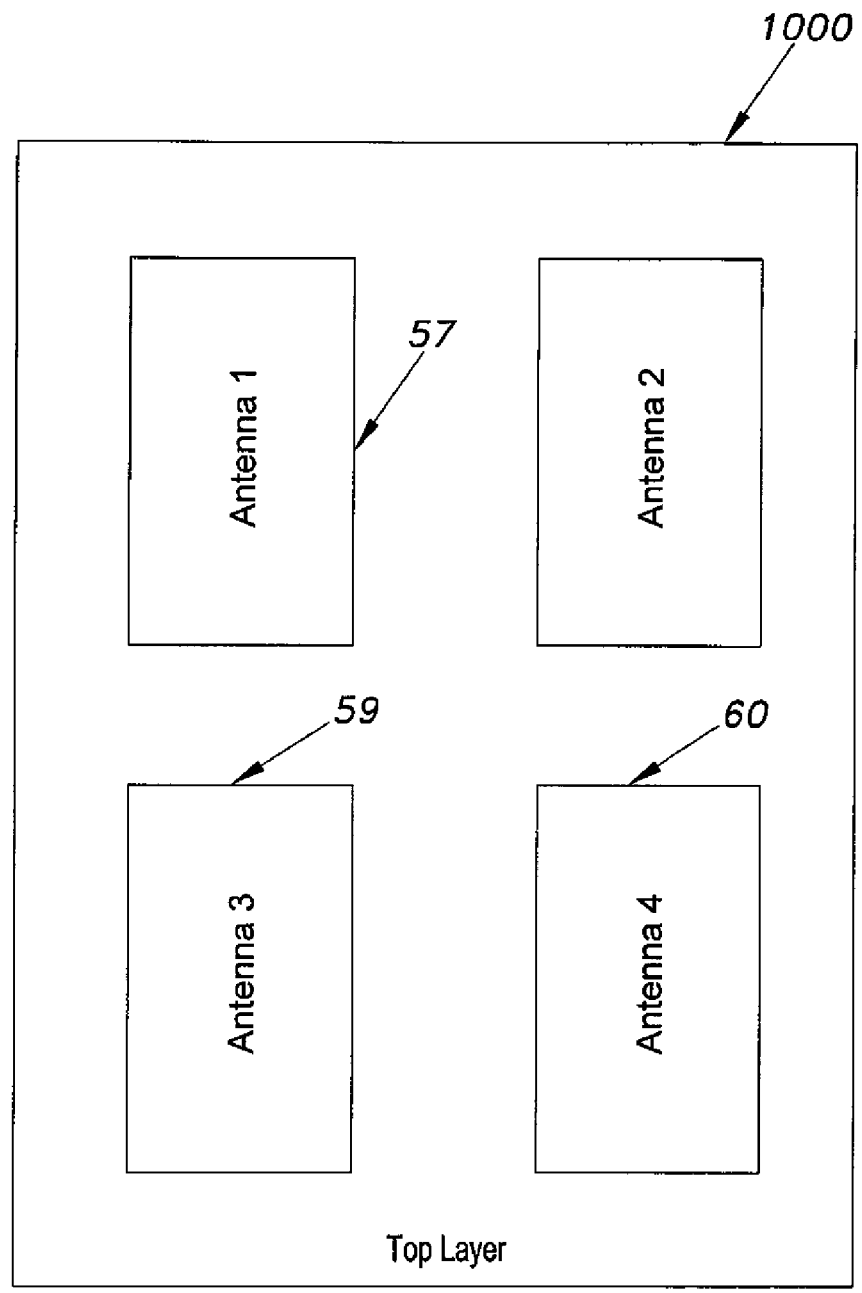
FIG. 7 is a top view of the printed circuit board with the four antennas of a microwave radio direction finding system according to the present invention.

FIG. 5 shows the INNER-2 layer 13, which represents a top view of SP circuit 3. The layout of the SP circuit 4 is depicted in FIG. 6. These two SP structures are functionally the same, except for differences in the positioning of the connections to antennas and the connections to the output analog circuitry. Each SP circuit has two input ports and four output ports. The SP circuit 3 input ports are designated by reference numbers 30 and 31. The SP circuit 3 output ports are designated by reference numbers 32, 33, 34, 35. SP circuit 4 input ports are designated by reference numbers 45, 46, while its output ports are designated by reference numbers 47, 48, 49, 50. Lines 36, 37 of SP circuit 3 and lines 51, 52 of SP 4 are terminated with matched impedances of 50Ω each.

Each SP circuit 3, 4 has four 90° hybrid ring couplers 41 having a diameter 40 of 22.82 mm and related transmission lines 38, 39 and 55. Each transmission line 38, 39, and 55 in SP 3 and in SP 4 has a length of $\lambda_{eff}/4$. Transmission line 44 in SP3 and SP4 is of length $\lambda_{eff}/2$. The scattering matrix of SP 3 and SP 4 is given by the following eqn. (1).

$$S = \begin{bmatrix} 0 & 0 & 0 & 0 & -j & j \\ 0 & 0 & 0 & 0 & -1 & -j \\ 0 & 0 & 0 & 0 & -1 & -1 \\ 0 & 0 & 0 & 0 & -j & -1 \\ -j & -1 & -1 & -j & 0 & 0 \\ j & -j & -1 & -1 & 0 & 0 \end{bmatrix} \quad (1)$$

Signals at the output ports of the SP circuits are derived from the scattering matrix presented in equation (1). Let us assume that there are two normalized wave inputs, $a_5$ and $a_6$, with different amplitudes and phases, the phase difference between the input signals is $\Delta\Phi = \Phi_6 - \Phi_5$, and the amplitude ratio of these signals is α, then:

$$a_5 = a \cdot \exp(j\phi_5) \quad (2)$$

$$a_6 = \alpha \cdot a \cdot \exp(j\Phi_6) = \alpha \cdot a_5 \cdot \exp(j\Delta\phi). \quad (3)$$

Therefore, we can calculate the normalized wave outputs using six-port-parameters as:

$$b_i = a_5 \cdot S_{5i} + a_6 \cdot S_{6i}. \quad (4)$$

The output signal can be written as a linear combination of input signals $a_5$ and $a_6$:

$$b_1 = a_5 \cdot S_{51} + a_6 \cdot S_{61} \quad (5)$$

$$b_1 = a\exp(j\phi_5)\frac{-j}{2} + \alpha a_5 \frac{j}{2}\exp(j\Delta\phi)$$

$$b_1 = \frac{a}{2}\exp\left(j\left(\phi_5 - \frac{\pi}{2}\right)\right) + \alpha a \frac{j}{2}\exp(j\phi_5)\exp(j\Delta\phi)$$

$$b_1 = \frac{a}{2}\exp\left(j\left(\phi_5 - \frac{\pi}{2}\right)\right) + \alpha a \frac{j}{2}\exp(j\phi_5)\exp(j\Delta\phi)\exp\left[\frac{-j3\pi}{2}\right]$$

$$b_1 = \frac{a}{2}\exp\left(j\left(\phi_5 - \frac{\pi}{2}\right)\right)\{1 + \alpha\exp(j\Delta\phi + \pi)\}$$

Similarly, for output port 2:

$$b_2 = a_5 \cdot S_{52} + a_6 \cdot S_{62} \quad (6)$$

$$b_2 = \frac{a}{2}\exp(j\phi_5) \cdot -1 + \alpha a_5 \frac{-j}{2}\exp(j\Delta\phi)$$

$$b_2 = \frac{-a}{2}\exp(j(\phi_5)) + \alpha a \frac{-j}{2}\exp(j\phi_5)\exp(j\Delta\phi)$$

$$b_2 = \frac{-a}{2}\exp(j(\phi_5))\left\{1 + \alpha\exp\left(j\Delta\phi + \frac{\pi}{2}\right)\right\}$$

The output signal at port 3 is described by:

$$b_3 = a_5 \cdot S_{53} + a_6 \cdot S_{63} \quad (7)$$

$$b_3 = \frac{-a}{2}\exp(j\phi_5) - 1 + \alpha a_5 \frac{-1}{2}\exp(j\Delta\phi)$$

$$b_3 = \frac{-a}{2}\exp(j(\phi_5)) + \alpha a \frac{-1}{2}\exp(j\phi_5)\exp(j\Delta\phi)$$

$$b_3 = \frac{-a}{2}\exp(j(\phi_5))\{1 + \alpha\exp(j\Delta\phi)\}$$

Similarly, for port 4:

$$b_4 = a_5 \cdot S_{54} + a_6 \cdot S_{64} \quad (8)$$

$$b_4 = \frac{-j}{4}a\exp(j\phi_5) + \alpha a_5 \frac{-1}{2}\exp(j\Delta\phi)$$

$$b_4 = \frac{-a}{2}\exp\left(j\left(\phi_5 + \frac{\pi}{2}\right)\right) + \alpha a \frac{1}{2}\exp(j\phi_5)\exp(j\Delta\phi) \cdot -j \cdot -j$$

$$b_4 = \frac{-a}{2}\exp\left(j\left(\phi_5 + \frac{\pi}{2}\right)\right) + \alpha a \frac{1}{2}\exp\left(j\left(\phi_5 + \frac{\pi}{2}\right)\right)\exp(j\Delta\phi)\exp\left[-j\frac{\pi}{2}\right]$$

$$b_4 = \frac{-a}{2}\exp\left(j\left(\phi_5 + \frac{\pi}{2}\right)\right)\left\{1 + \alpha\exp\left(j\Delta\phi - \frac{\pi}{2}\right)\right\}$$

In order to obtain the dc output signals, four power detectors are connected to the six-port circuit outputs. As known, the dc output voltage of an ideal power detector is proportional to the square magnitude of the RF input signal:

$$V_i = K_i|b_i|^2 \ i=1,2,3,4 \quad (9)$$

where $K_i$ constants are measured in V/W. Supposing that four identical detectors ($K_i = K$) are used, the do output voltages are, respectively:

$$V_1 = K_1|b_1|^2 = K\frac{a^2}{4}[1 + \alpha^2 - 2\alpha\cos(\Delta\phi)] \quad (10)$$

$$V_2 = K_2|b_2|^2 = K\frac{a^2}{4}[1 + \alpha^2 - 2\alpha\sin(\Delta\phi)] \quad (11)$$

$$V_3 = K_3|b_3|^2 = K\frac{a^2}{4}[1 + \alpha^2 - 2\alpha\cos(\Delta\phi)] \quad (12)$$

$$V_4 = K_4|b_4|^2 = K\frac{a^2}{4}[1 + \alpha^2 - 2\alpha\sin(\Delta\phi)] \quad (13)$$

Supposing that four identical detectors ($K_i = K$) are used, the de output voltages are, respectively, in the I/Q complex plane, and a $\Gamma$ vector can be defined using the four six-port dc output voltages:

$$\Gamma = (V_3 - V_1) + j(V_4 - V_2) \quad (14)$$

Then:

$$I = (V_3 - V_1) = \alpha \cdot Ka^2 \cdot \cos(\Delta\phi)$$

$$Q = (V_4 - V_2) = \alpha \cdot Ka^2 \cdot \sin(\Delta\phi)$$

$$\Gamma = I + jQ = K \cdot a^2 \cdot \exp(j\Delta\phi) \quad (15)$$

The relations in eqns. (15) show that the phase of the $\Gamma$ vector is equal to the phase difference between the RF input signals ($\Delta\Phi$). Therefore, this RF phase difference can be directly measured using both I and Q signals.

The length and width of the dielectric substrate are designated by reference numbers 42, 43 and 53, 54 respectively for both dielectric layers. For a typical smart phone device, the lengths and widths of the present system can be adjusted within the given dimensions. Both SP circuit 3 and SP circuit 4 can operate in the multiband frequency range of 1800 MHz, 2.1 GHz and 5.8 GHz with a bandwidth of at least 60 MHz. By adjusting the diameter of the hybrid round, i.e., ring, coupler, the operating frequency can be in the 1.8 GHz, 2.1 GHz or higher frequency bands for different wireless standards. This can cover cellular phone operation (GSM, PCS), wireless local-area-networks (WLAN), Bluetooth, WiBro, WiMax, etc.

As shown in FIG. 1, the signals received at antennas 1 and 3 are applied to the input ports 30, 31 (shown in FIG. 5) of SP circuit 3 via low noise amplifiers 2. Similarly, the signals received at antennas 1 and 2 are applied to the input ports 45, 46 (shown in FIG. 5) of SP circuit 4 via low noise amplifiers 2. In the SP circuits 3,4, the input signals are superimposed and produce output signals shifted 0°, 90°, 180°, and 270°. Two of the output signals correspond to in-phase components I, and two of the output signals correspond to quadrature components Q. The difference in phase of the two signals received at the antennas can be computed from the difference in the in-phase components and the difference in the quadrature components. This difference in phase is proportional to the angle of incidence, which is the elevation angle θ for SP circuit 3, and the azimuth angle Φ for SP circuit 4.

Figure 8:
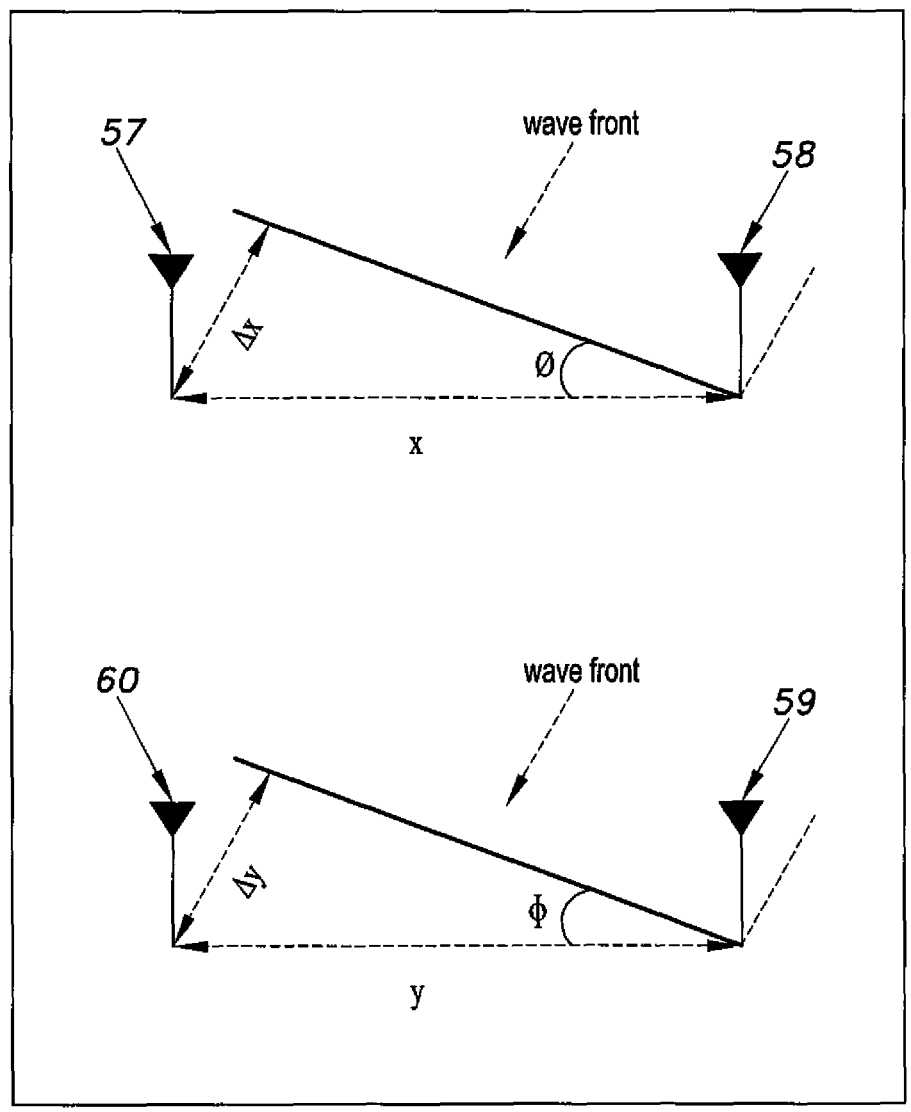
FIG. 8 is a diagram of wave fronts impinging the antennas of the microwave radio direction finding system according to the present invention.

To find the Angle of Arrival (AoA) in the θ-plane and in the Φ-plane, a schematic view of the geometrical model is presented in FIG. 8. The receiving antennas 57 (Antenna 1) and 58 (Antenna 2) are separated by a horizontal distance x. The receiving antennas 57 (Antenna 1) and 59 (Antenna 3) are separated by a vertical distance y. Owing to the angle of arrival θ (for Antennas 1 and 2) and Φ (for Antennas 1 and 3), there is a path difference between two propagation paths. So the propagated RF signal will be shifted with respect to each other by phase angles Δθ and ΔΦ, respectively. Once the I and Q signals are computed, (the output of power detector), the AoA for the azimuth angle Φ and for the elevation angle θ can be calculated by eqns. (16) and (17), respectively, where λ is the wavelength of the operating frequency of interest:

$$\sin\phi = \frac{\lambda}{y} \cdot \frac{\Delta\phi}{2\pi}. \quad (16)$$

$$\sin\theta = \frac{\lambda}{x} \cdot \frac{\Delta\theta}{2\pi}, \quad (17)$$

where Δφ is obtained from equation (15) and Δθ is obtained by a similar procedure.

Figure 9:
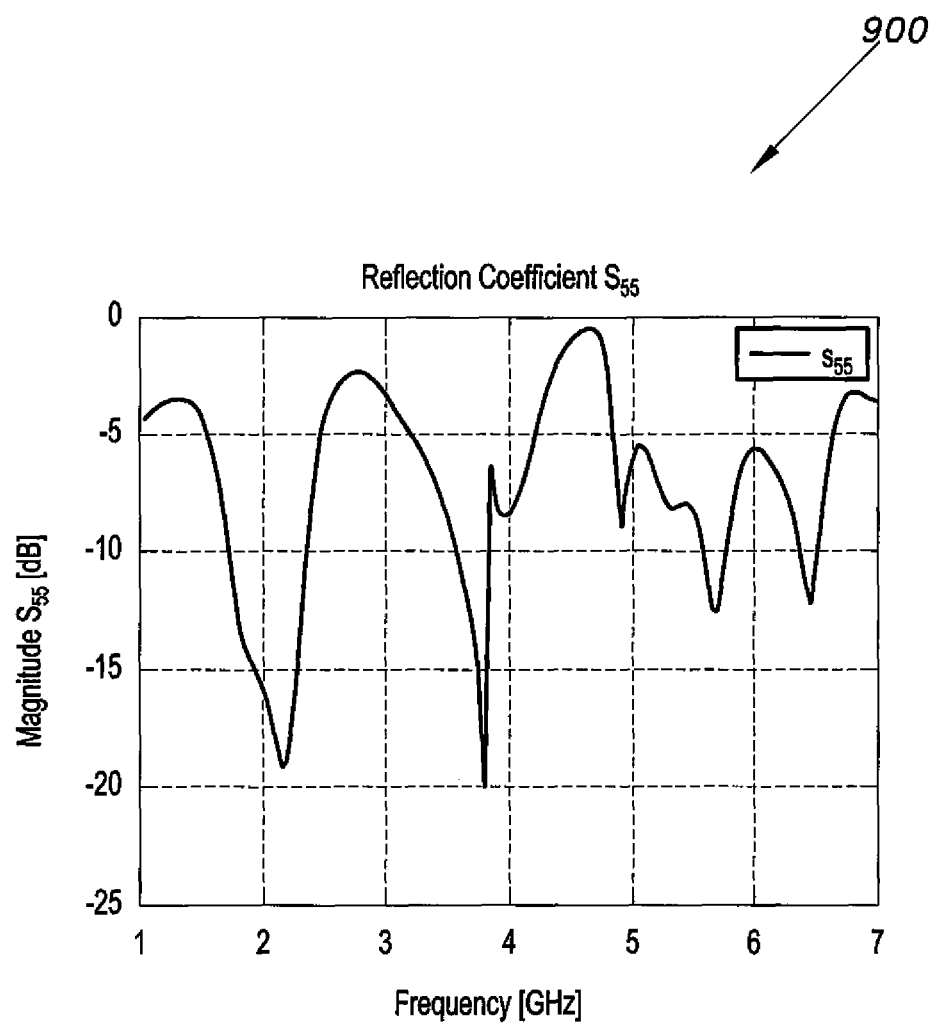
FIG. 9 is a reflection coefficient plot showing the magnitude of the reflection coefficient at port 5 of the first SP circuit over the frequency bands of interest of the microwave radio direction finding system according to the present invention.
Figure 10:
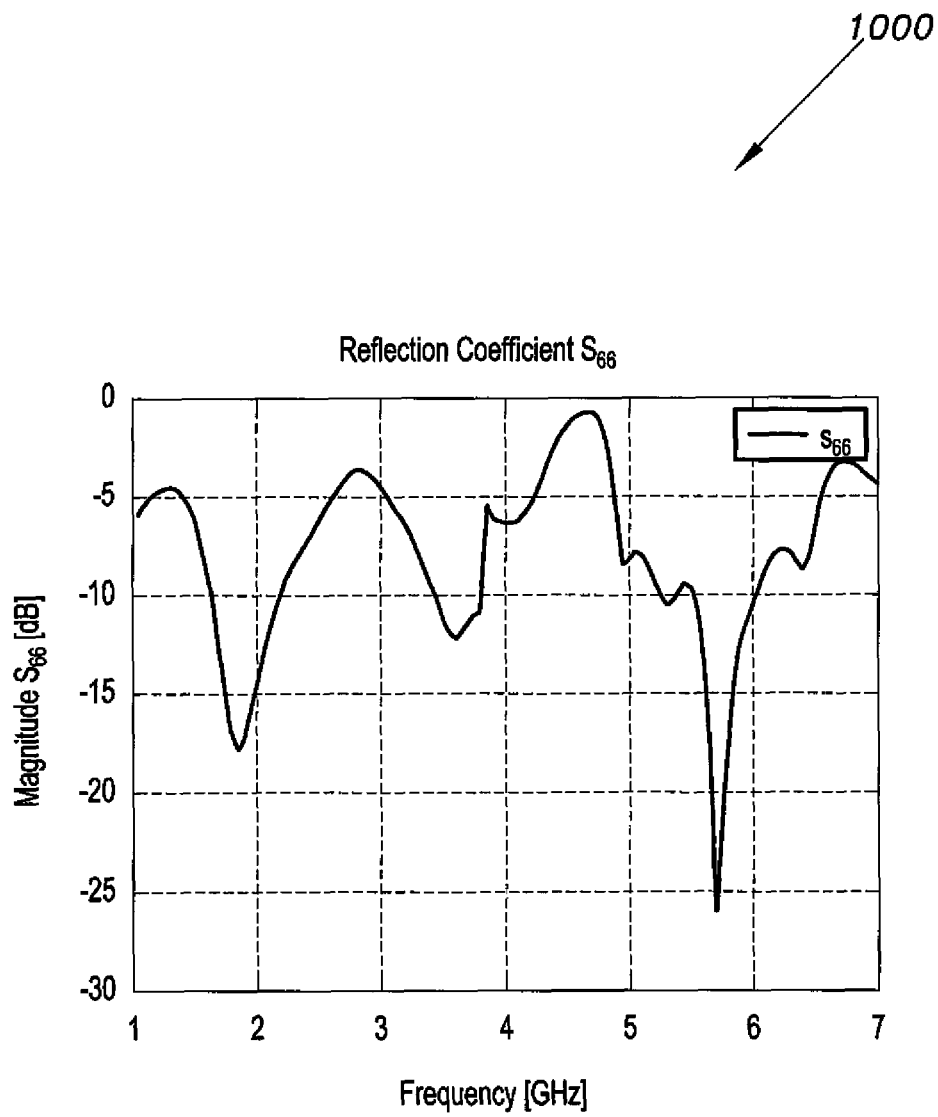
FIG. 10 is a reflection coefficient plot showing the magnitude of the reflection coefficient at port 6 of the first SP circuit over the frequency bands of interest of the microwave radio direction finding system according to the present invention.
Figure 11:
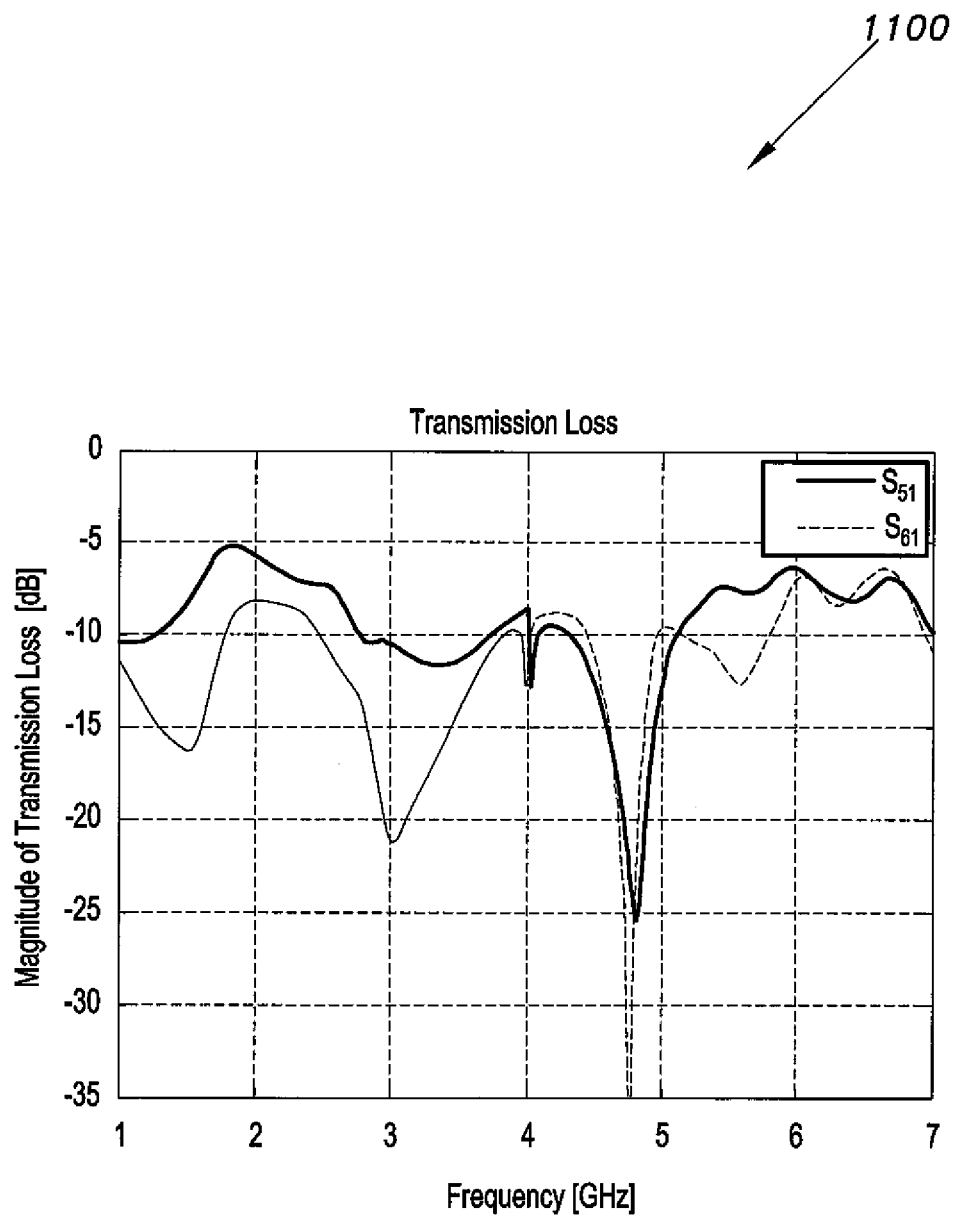
FIG. 11 is a transmission loss plot showing the magnitude of forward transmission loss for the $S_{51}$ and $S_{61}$ signals over the frequency bands of interest for the microwave radio direction finding system according to the present invention.

FIG. 9 and FIG. 10 show the simulated reflection coefficient at RF port 30, 31. Reflection coefficient characteristics are used primarily to ensure the operation of circuit in desired frequency range. The results in the obtained figures are excellent in terms of return losses over the desired frequency band of interest. All forward transmission losses were analyzed for the SP circuits 3, 4, and only results of $S_{61}$ and $S_{51}$ are shown in FIG. 11. Each signal $S_{61}$ and $S_{51}$ is passed through two 3 dB hybrid couplers, and hence −6 dB transmission losses are observed over the desired bands of frequencies.

Figure 12:
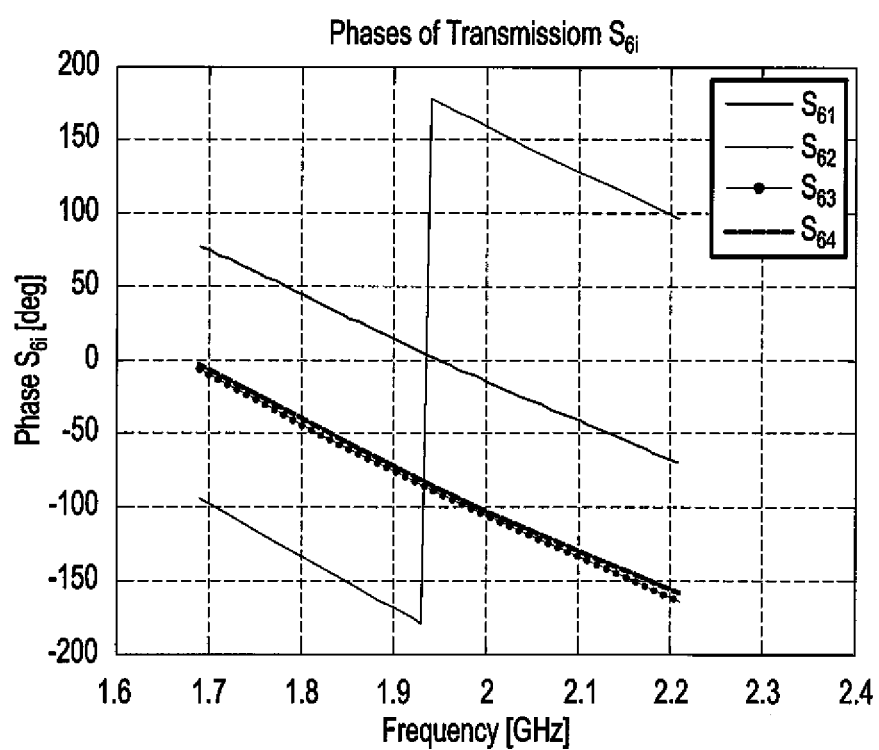
FIG. 12 shows the simulated phase of transmission $S_{6i}$ parameters over the low frequency (1.7-2.2 GHz) band of interest for the microwave radio direction finding system according to the present invention.
Figure 13:
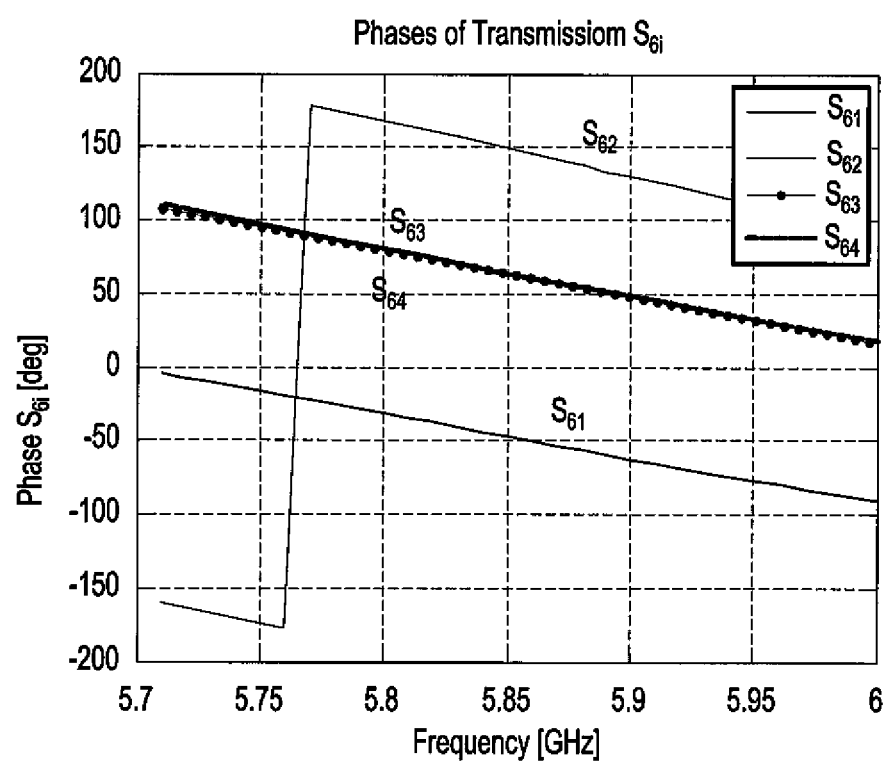
FIG. 13 shows the simulated phase of transmission $S_{6i}$ parameters over the high frequency (5.7-6 GHz) band of interest for the microwave radio direction finding system according to the present invention.

The simulated phase of transmission $S_{6i}$ parameters are shown in FIG. 11 and FIG. 12. In each case, a bandwidth of 60 MHz is observed over all three desired bands. For the given six-port architecture, all four phases are in multiples of 90°. For example, the phase difference between $S_{61}$ and $S_{62}$ is 180°, while $S_{63}$ and $S_{64}$ are in same phase. The total error in the phase difference $\Delta\theta$ and $\Delta\Phi$ of input signals at ports 30, 31 and 45, 46 of SP circuits 3, 4, computed at the output of the six-ports, is ±5°. This is the maximum phase difference error we are expecting after processing for both elevation and azimuth angles in two planes.

It is to be understood that the present invention is not limited to the embodiments described above, but encompasses any and all embodiments within the scope of the following claims.

We claim:

1. A microwave radio direction finding system, comprising:
   a dielectric substrate assembly having first, second, third, and fourth printed circuit boards (PCBs) laminated together in a vertical stack from first through fourth PCB, each of the PCBs having a top surface and a bottom surface;
   a plurality of low noise RF amplifiers;
   first and second six-port (SP) circuits formed from microstrips on the PCBs, the first six-port circuit being disposed between the second and third PCB, the second six-port circuit being disposed on the bottom surface of the fourth PCB, each of the SP circuits having four microstrip rings, transmission lines connecting the rings, two input ports, four output ports, and a pair of transmission lines terminated with matched 50Ω impedances;
   a first ground plane disposed between the first PCB and the second PCB;
   a second ground plane disposed between the third PCB and the fourth PCB;
   at least first, second, and third patch antennas disposed in a Cartesian plane on the top surface of the first PCB, the first and third patch antennas being separated a horizontal distance x along an x-axis of the Cartesian plane, the first and second patch antennas being separated a vertical distance y along a y-axis of the Cartesian plane, the patch antennas, the SP circuits, and the transmission lines being dimensioned and configured for reception of multiple radio frequency bands in the microwave region between the 1.7 GHz to 2.2 GHz and 5.75 GHz to 6 GHz bands, the first and third antennas being connected to the two input ports of the first SP circuit, the first and second antennas being connected to the two input ports of the second SP circuit;
   a first in-phase difference amplifier connected to two of the output ports of the first SP circuit, the first in-phase difference amplifier being configured to produce an output signal corresponding to an in-phase component ($I_1$) of signals input from the first and third antennas;
   a second quadrature difference amplifier connected to two of the output ports of the first SP circuit, the first quadrature difference amplifier being configured to produce an output signal corresponding to a quadrature component ($Q_1$) of signals input from the first and third antennas;
   a third in phase difference amplifier connected to two of the output ports of the second SP circuit, the third in-phase difference amplifier being configured to produce an output signal corresponding to an in-phase component ($I_2$) of signals input from the first and second antennas;
   a fourth quadrature difference amplifier connected to two of the output ports of the second SP circuit, the fourth quadrature difference amplifier being configured to produce an output signal corresponding to a quadrature component ($Q_2$) of signals input from the first and second antennas;
   an analog-to-digital (A/D) converter connected to the differential amplifiers, the A/D converter producing digital representations of the $I_1$, $I_2$, $Q_1$, and $Q_2$ output signals; and
   a digital signal processor connected to the A/D converter, the digital signal processor having means for determining the elevation angle $\theta$ and the azimuth angle $\Phi$ of an incident RF wave front based on the A/D digital representation of the differential in-phase and quadrature difference components, the separations x and y of the antennas, and the frequency $\lambda$ of the radio frequency signals received at the antennas.

2. The microwave radio direction finding system according to claim 1, wherein said means for determining the elevation angle $\theta$ and the azimuth angle $\Phi$ of an incident RF wavefront includes means for computing the phase angle $\Delta\theta$ between the radio frequency signals received at the first and third antennas from the in-phase and quadrature components $I_1$ and $Q_1$.

3. The microwave radio direction finding system according to claim 2, wherein said means for determining the elevation angle $\theta$ and the azimuth angle $\Phi$ of an incident RF wavefront includes means for computing the elevation angle of the received radio frequency signals by solving:

$$\theta = \arcsin\left(\frac{\lambda}{x} \cdot \frac{\Delta\theta}{2\pi}\right).$$

4. The microwave radio direction finding system according to claim 1, wherein said means for determining the elevation angle $\theta$ and the azimuth angle $\Phi$ of an incident RF wavefront includes means for computing the phase angle $\Delta\phi$ between the radio frequency signals received at the first and second antennas from the in-phase and quadrature components $I_2$ and $Q_2$.

5. The microwave radio direction finding system according to claim 4, wherein said means for determining the elevation angle $\theta$ and the azimuth angle $\Phi$ of an incident RF wavefront includes
   means for computing the azimuth angle of the received radio frequency signals by solving:

$$\Phi = \arcsin\left(\frac{\lambda}{y} \cdot \frac{\Delta\phi}{2\pi}\right).$$

6. The microwave radio direction finding system according to claim 1, wherein the transmission lines connecting three of the four rings in each said coupler has a length of $\lambda_{eff}/4$, and one of the transmission lines connecting the fourth ring has a length of $\lambda_{eff}/2$.

7. The microwave radio direction finding system according to claim 1, wherein the digital signal processor has means for computing the elevation angle and the azimuth angle for radio frequency signals on different bands received at said antennas simultaneously.

* * * * *